US012399690B1

(12) United States Patent
Kaduwela et al.

(10) Patent No.: US 12,399,690 B1
(45) Date of Patent: Aug. 26, 2025

(54) DIGITAL KNOWLEDGE WORKER DEVELOPMENT AND DEPLOYMENT PLATFORM

(71) Applicant: Kavi Associates, LLC, Barrington, IL (US)

(72) Inventors: Vijitha Kaduwela, South Barrington, IL (US); Rajesh Inbasekaran, Hawthorn Woods, IL (US); Naomi Arcadia Kaduwela, Chicago, IL (US); David Thomas Zinger, Lombard, IL (US); Vimal Raj Arockiasamy, Buffalo Grove, IL (US); Balakumaran Manoharan, Wheeling, IL (US)

(73) Assignee: Kavi Associates, LLC, Barrington, IL (US)

( * ) Notice: Subject to any disclaimer, the term of this patent is extended or adjusted under 35 U.S.C. 154(b) by 215 days.

(21) Appl. No.: 18/207,048

(22) Filed: Jun. 7, 2023

Related U.S. Application Data

(60) Provisional application No. 63/349,986, filed on Jun. 7, 2022.

(51) Int. Cl.
*G06F 8/33* (2018.01)

(52) U.S. Cl.
CPC .................................... *G06F 8/33* (2013.01)

(58) Field of Classification Search
CPC ........................................................ G06F 8/38
See application file for complete search history.

(56) References Cited

U.S. PATENT DOCUMENTS 11,797,272 B2 * 10/2023 Makhija ........... G06V 30/19113
2021/0042110 A1 * 2/2021 Basyrov ................ G06N 3/006
2021/0157551 A1 * 5/2021 Bliss .................... G06F 40/216

* cited by examiner

*Primary Examiner* — Duy Khuong T Nguyen
(74) *Attorney, Agent, or Firm* — Vedder Price P.C.

(57) ABSTRACT

The present disclosure provides systems and methods implementing an intelligent software application (ISA) that offers a comprehensive one-stop-shop solution for developing and deploying Digital Knowledge Worker™ systems (DKWs) with human-in-the-loop (HITL) and/or human-on-the-loop (HOTL) architecture enabling high-value and complex decision-making in technical, clinical, financial, sales, marketing, operational, R&D, and other functional domains across any industry vertical.

13 Claims, 2 Drawing Sheets

DIGITAL KNOWLEDGE WORKER DEVELOPMENT AND DEPLOYMENT PLATFORM

CROSS REFERENCE TO RELATED APPLICATIONS

This application claims priority to and the benefit of U.S. Provisional Application No. 63/349,986 filed Jun. 7, 2023, the content of which is hereby incorporated by reference.

FIELD OF THE DISCLOSURE

The present disclosure relates to an intelligent software application (ISA) that offers a comprehensive one-stop-shop solution for developing and deploying Digital Knowledge Worker™ systems (DKWs) with human-in-the-loop (HITL) and/or human-on-the-loop (HOTL) architecture for high-value, and complex decision-making in technical, clinical, financial, sales, marketing, operational, R&D and other functional domains across any industry vertical.

BACKGROUND

The term "knowledge worker" was first coined by Peter Drucker in his book *The Landmarks of Tomorrow* in 1959 to refer to a human worker who applies theoretical and analytical knowledge, acquired through formal training, to perform their work. This was a paradigm shift in comparison to agricultural workers and factory workers of the day, as the notion of "work" shifted from being manual to cerebral, leading to an age when people would generate more value with their minds than with their muscles.

Examples of knowledge workers include professionals in information technology fields, such as programmers, web designers, system analysts, technical writers, and researchers. Knowledge workers are also comprised of pharmacists, accountants, engineers, architects, lawyers, physicians, nurses, scientists, financial analysts, and design thinkers.

Thereafter, knowledge became a more crucial economic resource than land, labor, or capital. Drucker declared that "increasing the productivity of knowledge workers is the most important contribution management needs to make in the 21st century." In the last few decades management invested in resources to augment the knowledge workers and make them more productive. These investments include providing knowledge workers with insights derived from performing descriptive, predictive and prescriptive analytics, machine learning (ML), and artificial intelligence (AI) to make them more productive. Human knowledge workers augmented with such machine-based insights are referred to as "augmented knowledge workers." This strategy of augmenting knowledge workers was partially successful, while negatively impacting the knowledge workers themselves.

The reality is that knowledge workers are reaching human capacity limits and are becoming burned out. They are highly stressed, overweight, and sick. For example, mental illness is a growing problem among healthcare knowledge workers including doctors. Many no longer wish to perform their specialized and stressful work anymore, with countless human knowledge workers opting out of the knowledge worker workforce. They are resorting to gig work, short work week, work-life balance, health and wellness, passive income, etc.

This is reminiscent of the plight of the farm workers and factory workers post-agricultural and post-industrial revolutions when the demands for increasing productivity kept going up for human workers resulting in stretching their human capabilities, exploiting them, exposing them to toxic work environments with long work hours and poor benefits and pay.

Similarly, as businesses grow and become more complex, some work environments become unsuitable for humans. In these situations, the complexity, scale, and the required speed with which decisions must be made are beyond human capabilities, resulting in mind numbing, toxic work environments for humans. These work environments are characterized by factors such as high volume and high frequency transactions; mission critical decisions that need to be made with high speed; multiple objectives, soft and hard constraints, and tradeoffs that needs to be considered while making decisions; highly complex business processes and legacy IT systems; and highly regulated industry environments to name a few.

Such toxic work environments are easy to identify, as typically there is a high concentration of human knowledge workers with accumulated tribal knowledge. As the complexity of the work grows, typically more and more humans are added, increasing the complexity of the human organizations, with division of work and narrow specializations further increasing the inefficiencies in high-value and complex decision-making. Decisions made by humans in such situations are highly suboptimal. Humans are not capable of incorporating hundreds, sometimes thousands, of data points and analytics that need to be considered when making high-value optimal decisions.

Forbes declared that 2020 was the year of the knowledge workers as the estimated count of knowledge workers in the world reached 1 billion. While this may be true, there is a severe shortage of knowledge workers across many industries around the world. Accordingly, a long felt and unmet need exists for improved and digitized systems, methods, and solutions for completing knowledge work.

BRIEF SUMMARY OF THE DISCLOSURE

This summary is provided to introduce a selection of concepts in a simplified form that are further described in the detailed description of the disclosure. This summary is not intended to identify key or essential inventive concepts of the claimed subject matter, nor is it intended for determining the scope of the claimed subject matter.

The present disclosure relates to an ISA that offers a comprehensive one-stop-shop solution for developing and deploying DKWs with HITL and/or HOTL architecture for high-value, and complex decision-making in technical, clinical, financial, sales, marketing, operational, R&D, and other functional domains across any industry vertical.

With the advancements and convergence of complementary disciplines such as software engineering, data engineering, data science, industrial engineering, process engineering, new products development, artificial intelligence, and industry and functional domain knowledge, it is now possible to codify and train DKWs to acquire theoretical and analytical knowledge, similar in concept to how a human knowledge worker would acquire knowledge through formal training and experience to perform particular work. This multidisciplinary approach is again a paradigm shift as the implicit assumption that knowledge work must be performed solely by humans no longer holds true.

As contemplated herein, an ISA for DKWs combines embedded advanced analytical processes and artificial intelligence, with HITL and/or HOTL, capable of performing work similar to that currently performed by a human knowledge worker.

In many cases, purpose-built DKWs will perform better than a human knowledge worker alone at the same specialized task since they are not bound by the same human limitations such as stress, fatigue, motivation, health, work hours, work-life balance, speed, quality, and the ability to manage complexity.

The role of the human in the new paradigm changes to either HITL, and/or HOTL.

An HITL standard allows humans to have complete control over starting and stopping any action associated with high-value and complex decisions made by the ISA.

An HOTL standard pushes human control away from the center of the decision-making process of the ISA. An HOTL still provides human oversight of an automated system, but the artificial intelligence springs into action, without needing human pre-approval as would be required with an HITL design.

Very often there is an enormous amount of trapped value that can be unlocked by introducing DKWs to work in place of, or side by side with, a human knowledge worker.

In view of the fact that tribal knowledge is embedded into the ISA for DKWs, the level of expertise of an HITL and HOTL is relatively lower compared to the previous case of a purely human knowledge worker. Therefore, once the intelligent software is developed, humans with no prior functional expertise can be trained very easily in a short period of time to work in the DKW paradigm. Thus the entry level job qualification to become an HITL or HOTL is much lower. So, it becomes possible to "deskill" the job roles held by traditional human knowledge workers.

Moreover, as the ISA matures and improves, the role of the human can migrate from HITL to HOTL where there is an even lesser requirement for human skills. As the ISA matures over time by way of HITL/HOTL contributions, it can be further fine-tuned to require less HITL/HOTL input in the future. This concept is known as HITL to HOTL maturity; however, humans will always continue to provide a level of oversight.

Therefore, the ISA for DKWs is an innovative solution for the human knowledge worker labor shortages we are faced with in many industries around the world.

In embodiments of the present disclosure, specific DKWs are each preconfigured to perform a specific task. In other embodiments, DKWs are configured to perform multiple tasks and/or learn on the job to provide broad applicability.

In embodiments of the present disclosure, this objective is achieved by way of an ISA that offers a comprehensive one-stop-shop solution for creating and deploying DKWs for high-value and complex decision-making with connected databases; embedded descriptive, predictive, and prescriptive analytics; machine learning and AI models; a user interface for HITL and HOTL; real-time data integrations using microservices; batch and offline data integration using data integration pipelines; and associated DevOps and MLOps processes for managing development and deployment as well as operationalizing analytical models, machine learning, and AI algorithms.

Examples of descriptive, predictive, and prescriptive analytics include key performance indicators (KPIs) and metrics, forecasting, optimization, and other advanced analytics algorithms.

Examples of Machine Learning and AI models include supervised learning and unsupervised learning algorithms. Categories of supervised learning algorithms include linear and logistic regression, naïve Bayes classification, neural networks, random forest, etc. Categories of unsupervised learning algorithms include k-means clustering, principal component analysis, and hierarchical clustering.

Embodiments of the ISA for DKWs are flexible and configurable to align with owners' preferred technology stacks consisting of modern commercially available mature cloud native technology components and/or open-source technology components offering elastic scalability. Embodiments of the present disclosure address one or more of the disadvantages and problems associated with the human knowledge workers discussed above.

BRIEF DESCRIPTION OF THE DRAWINGS

The foregoing summary, as well as the following detailed description of the disclosure, is better understood when read in conjunction with the appended drawings. For the purpose of illustrating the disclosure, exemplary constructions of the inventions of the disclosure are shown in the drawings. However, the disclosure and the inventions herein are not limited to the specific methods and instrumentalities disclosed herein.

DETAILED DESCRIPTION

Figure 1:
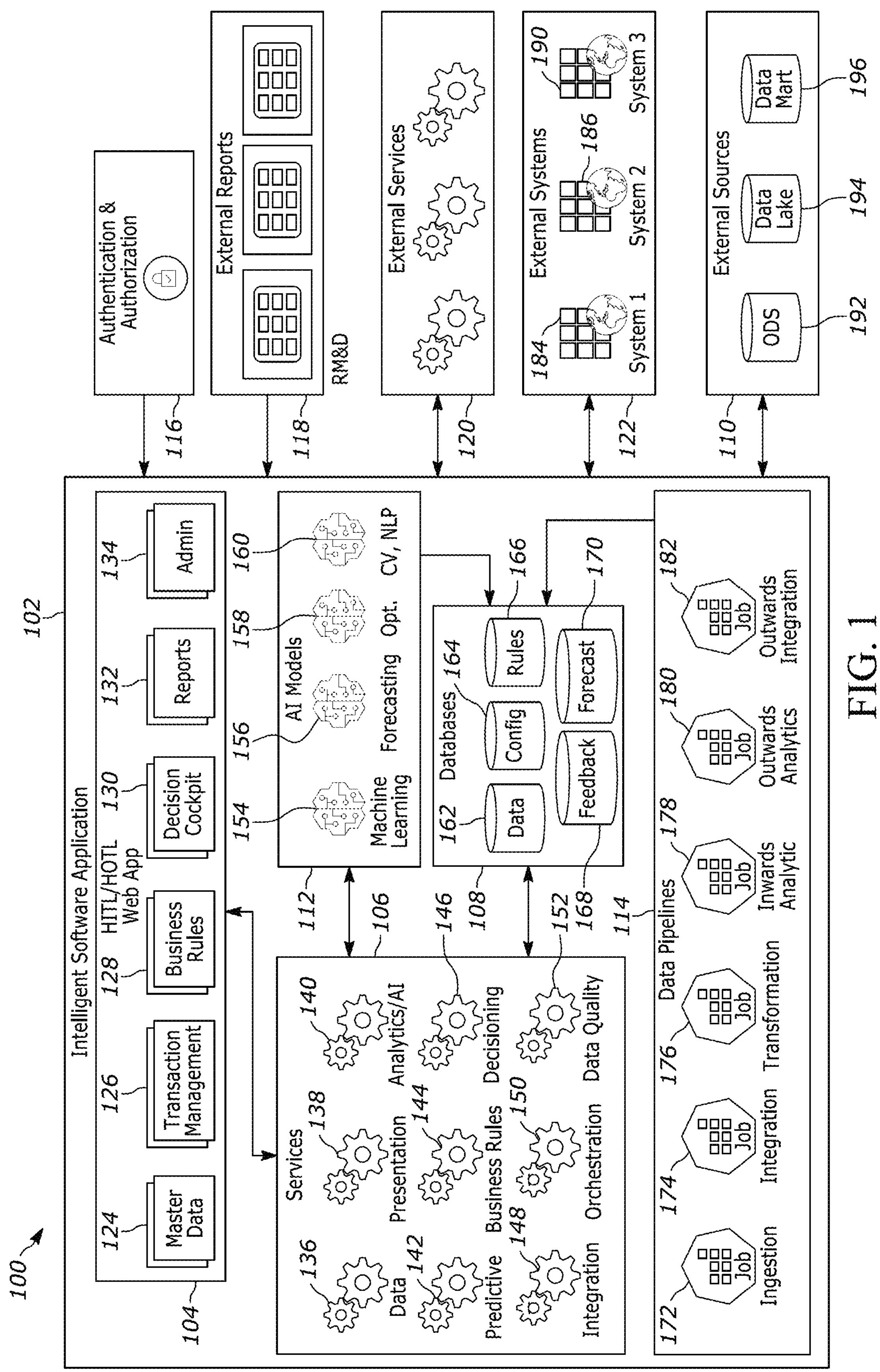
FIG. 1 is an exemplary reference architecture diagram of a platform for the ISA for developing and deploying DKWs.

This disclosure as a whole may be best understood by reference to the following detailed description when read in conjunction with the accompanying drawings, drawing descriptions, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

The Concept

As shown in FIG. 1, an embodiment of the present disclosure provides an ISA 100 that offers a comprehensive one-stop-shop solution for developing and deploying DKWs 102 for high-value and complex decision-making. The framework implemented through the ISA 100 is flexible and configurable to align with the preferred technology stack of the owner, consisting of modern commercially available mature cloud native technology components and/or open-source technology components both offering elastic scalability. Embodiments of framework disclosed herein seamlessly integrates multiple processes and components described below into an ISA 100 capable of developing and deploying a purpose-built DKWs for technical, clinical, financial, marketing, operational and other decision-making in any industry vertical.

Cloud-Based and/or On-Premises (On-Prem) Infrastructure

The ISA may utilize cloud-based or on-prem infrastructure to develop and deploy DKWs.

Cloud infrastructure is the collection of hardware and software components such as computing power, networking, storage, and virtualization resources needed to enable cloud computing. Cloud infrastructure types usually also include a user interface (UI) for managing these virtual resources.

Similarly, on-prem Infrastructure is the collection of hardware and software components such as computing power, networking, storage, and virtualization resources needed to enable cloud computing, that customers have configured in their internal data centers. On-prem infrastructure types usually also include a UI for managing these virtual resources.

In embodiments, systems and methods in accordance with the present disclosure can be implemented on one or more on-prem computing devices.

In an embodiment, such computing devices comprise an internal network and a client network. The internal network and the client network are each suitable for connecting to one another and to a plurality of computing devices and each may comprise one or more networks such as a local area network (LAN), a wide area network (WAN) such as the Internet, telephone networks including telephone networks with dedicated communication links and/or wireless links, and wireless networks. In an embodiment, the internal network and the client network are each LANs and the internal network is connected to the client network via the Internet. As such, the internal network and the client network may be geographically separated. In an embodiment, the internal network and/or the client network comprise(s) a plurality of separate networks (e.g., a plurality of separate LANs) that are linked together (e.g., by the Internet) such that the various elements of the internal network and/or the client network are geographically separated from one another. Various hardware devices (including, but not limited to, routers, modems, switches, etc.) may separate the elements of the hardware configuration, so long as the various elements are communicatively coupled together. In embodiments, the local network comprises a data center implementing one or more cloud based services.

In an embodiment, the internal network comprises one or more computing devices configured to implement an engine and an application server. Such elements are each implemented on a separate computing device in embodiments, while in other embodiments a single computing device may implement two or more of the engine, the application server, and the metadata server (or other components). Alternatively, in other embodiments any of these elements may be implemented on multiple computing devices (e.g., the application server may be implemented using one server for computational tasks and a separate server for storage tasks). Each of the engine and the application server, is connected via a suitable communication link, such as a dedicated communication line or a wireless communication link. In embodiments, additional components are also employed (e.g., to operate microservices, AI models, databases, and/or data pipelines as discussed herein).

In an embodiment, the computing devices each comprise a storage device configured to contain computer-readable instructions, central processing unit (CPU) communicatively coupled to the storage device and configured to execute the computer-readable instructions, an input/output (I/O) unit communicatively coupled to the CPU and configured to relay data to other computing devices, and a memory communicatively coupled to the CPU. The computing devices may further comprise a display device and/or one or more standard input devices such as a keyboard, a mouse, speech processing means, or a touchscreen.

In an embodiment, the ISA further comprises a display device and an input device as described herein and renders a graphical user interface (GUI) that is used to convey information to and receive information from a user. The GUI includes any interface capable of being displayed on a display device, including, but not limited to, a web page, a display panel in an executable program running locally on the client device 118, or any other interface capable of being displayed to the user. The GUI may be transmitted to the client device from the application server. In embodiments, the GUI is displayed by the client device using a browser or other viewing software, including, but not limited to, Microsoft Internet Explorer, Google Chrome, Apple Safari, or Mozilla Firefox, or any other commercially available viewing software. In an embodiment, the GUI is generated using a combination of commercially available hypertext markup language (HTML), cascading style sheets (CSS), JavaScript, and other similar standards.

In embodiments, the GUI resides on the application server, which comprises a web server. The application server transmits the GUI to the client device, which displays it to the user and obtains input from the user in response. The application server is configured to interact directly with other components of the internal network and indirectly with components of the client network and/or other networks (i.e., via the engine).

The engine intermediates between the application server and third-party and/or client services so as to enable the interaction of the ISA with various other systems.

Process Reengineering

In embodiments, process reengineering is used to design a DKW 102. This process reengineering captures a previously existing process of how human knowledge workers make decisions in a particular domain, such as through multiple interviews with the human knowledge workers themselves as well as their superiors, peers and/or work partners from other functions in the organization they interact with for making decisions. These interviews may take place in a group setting or an individual setting. These interviews are used to map the workflows human knowledge workers follow in their decision-making and reengineer those workflows to simplify and streamline. The resulting process workflows following the simplification and streamlining exercise are suitable for DKWs 102 to follow in a software-based decision-making process.

Value Engineering

Developing and deploying DKWs may be an expensive proposition, particularly for new domains where DKWs have not previously been performed. In embodiments, it is contemplated that DKWs will be deployed when the anticipated return on investment (ROI) is high. In embodiments, value engineering is used to determine the business benefits and the ROI of the investment for developing the business case for such investments.

New Product Development

In embodiments, it is contemplated that the development and deployment of DKWs will be effected in a similar manner to those of any new software product. Therefore, process frameworks (such as design thinking) used for software products may be employed to develop and deploy DKWs.

Reference Architecture

In embodiments, DKWs are developed using one or more reference architectures that are not technology specific. An embodiment of one such reference architecture showing the interactions among multiple components using microservices to develop and deploy DKWs is depicted in FIG. 1. Each of the components that contribute to this reference architecture are described below.

User Interface for HITL and HOTL

User interface and user experience (UI/UX) design is an important part of the DKWs 102's development and deployment, as the Intelligent Software must interact with the HITL and/or HOTL user interface 104 to perform its work. In the embodiment shown, a DKW 102 presents a standard web-based application user interface 104 that may be displayed on a client device to a user. The HITL/HOTL web-based application user interface allows HITLs/HOTLs to interact with the ISA by accessing master data 124, managing transactions 126, implementing business rules 128, making use of the decision cockpit 130, generating reports 132, and performing administrative tasks 134.

Data Services and UI Services

In embodiments, one or more microservices 106 such as data services 136, presentation services 138, analytics/AI services 140, predictive services 142, business rules 144, decision-making services 146, integration services 148, integration services 148, orchestration services 150, and data quality services 152, as well as UI services, would work hand in hand to fetch the information from a variety of internal and external sources and present them in the user interface 104 to bring the information together for the DKWs 102 to execute a decision flow. Such microservices may be implemented on the engine on an internal network. In other embodiments, external microservices 120 may be used which may be based on one or more third party networks and/or on other computer devices. In some embodiments, external systems 122 may also interact with various external systems 184-190, and such external systems may be peripheral systems.

Internal Database

In the embodiment shown, the DKW 102 has an internal database 108 to store the pertinent information for executing a decision flow. This information can consist of master data related to the decisions being made as well as storing the information for audit purposes to be used by the HITL and HOTL. Data stored in the internal database 108 may include various data 162, configurations 164, rules 166, feedback 168, and forecast 170.

Data Lake and Data Warehouse

In the embodiment shown, one or more external sources 110, such as a data lake and/or a data warehouse, store historical information that is necessary for generating the descriptive, predictive, and prescriptive analytics, as well as training the AI Models 112 such as the Machine Learning (ML) models 154, forecasting 156, open pre-trained transformers 158, computer vision and natural language processing 160 along with other AI algorithms known to those with ordinary skill in the art. In alternative embodiments, these external sources 110 may be internalized (e.g., by storing them in the internal databases 108). The internal database may include an operational data store (ODS) 192 for operational reporting, a data lake 194 for centrally storing raw and unstructured data, and a data mart 196 for storing a smaller subset of data for a particular function.

Data Integration Pipelines

In the embodiment shown, data integration pipelines 114 bring the data from the operational source IT systems to external sources 110 such as the data lake 194 and data warehouse 196 while applying the necessary transformations, data quality checks and business rules. Developing data integration pipelines 114 is a labor-intensive programming step. This step can be made efficient by using a no-code, technology agnostic visual programing tool. Data pipelines 114 ingest 172, integrate 176, transform 176 data utilized by the ISA. Data pipelines 114 perform inwards analytic 178 and outwards analytics 180 as well as outwards integration 182.

Embedded Analytics, ML, and AI

DKWs 102 decision flow requires microservices 106 such as embedded analytics, and AI models 112 such as machine learning (ML) and deep learning AI algorithms for executing the intelligent steps in the decision flow. Microservices 106 may include embedded analytics, descriptive analytics, predictive analytics, and prescriptive analytics as required. Developing and fine-tuning analytics, ML analytics, and deep learning and AI algorithms is a labor-intensive programming step. This process can be made efficient by using a tool that is a wizard driven, no-code, technology agnostic visual programing tool.

Analytics, ML, and AI Micro Services

Analytics, ML, and AI need to be embedded in the decision flow as microservices 106.

Business Rules

In the embodiment shown, one or more decision flows also include codified business rules 128. Business rules 128 are logically defined rules that determine how data should be manipulated so as to perform a desired operation, such as performing data analytics. These business rules 128 can manifest themselves as preference rules, exception rules and other business rules 128. These business rules 128 can be implemented during the data integration pipelines 106 as well as in the user interface 104 in the decision flow.

Data Quality

In an embodiment, one or more decision flows also include codified data quality rules. Data quality rules 152 are logically defined rules that determine how data should be cleaned before using for analytics and AI. These data quality rules can be implemented during the data integration pipelines as well as the user interface in the decision flow.

Development and Deployment Processes

Taking all the components above through the development, QA and production as well as deployment and maintenance in production is referred to as DevOps.

MLOps refers to taking the embedded analytics, ML models, and deep learning and AI algorithms through the development, QA, and production deployment as well as maintaining them in production by periodically refreshing them by retraining them using the latest available data.

Security

DKWs 102 need to be deployed with appropriate security protections in place. They can be deployed in an on-prem or a cloud environment. In both cases, authorization and authentication 116 of the human users who interact with the DKWs 102 in the capacity of HITL and HOTL need to be properly handled via the user interface 104.

Figure 2:
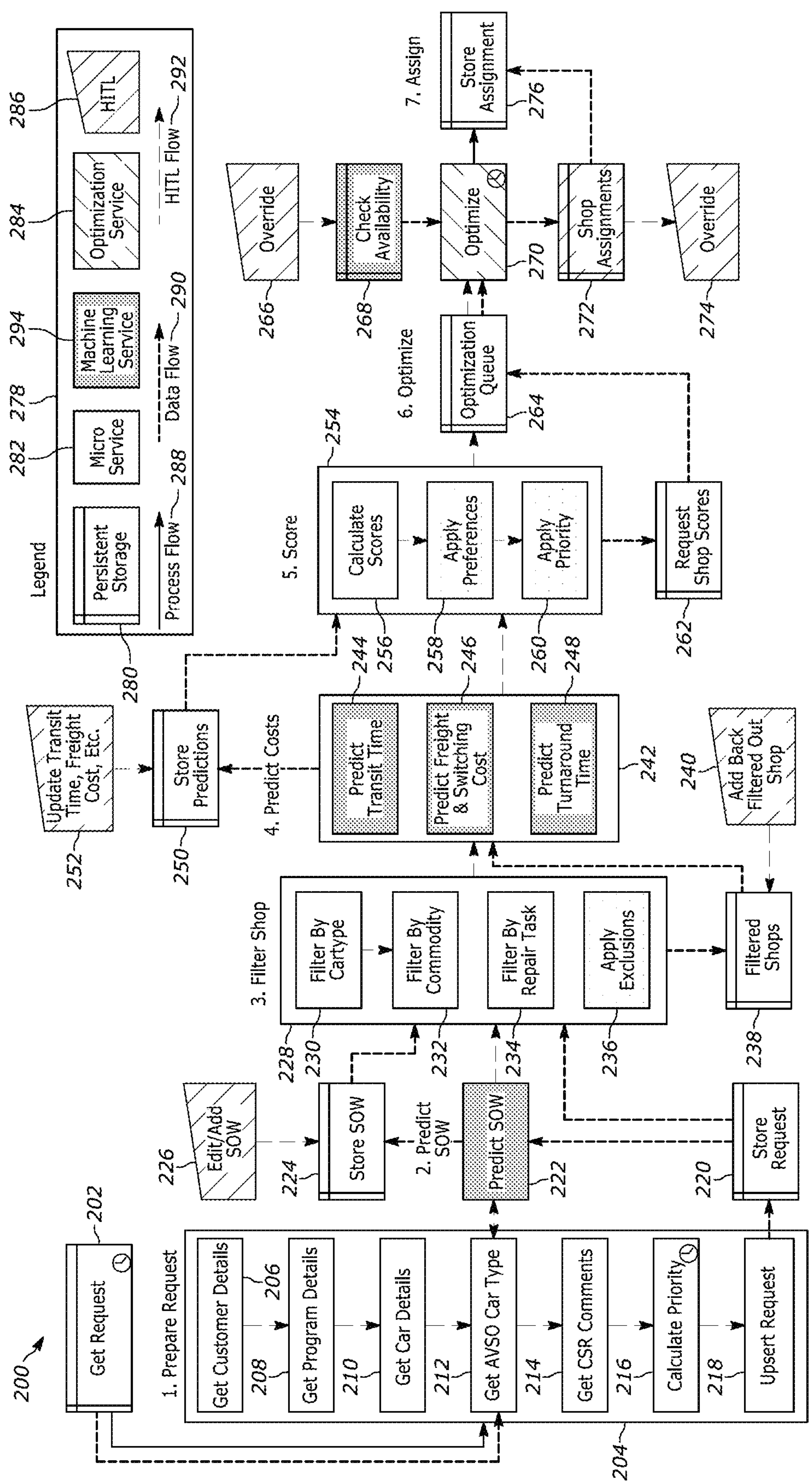
FIG. 2 is an exemplary workflow of an embodiment of the ISA for a DKW for a digital railcar repair scheduler.

Intelligent Software Application for Deploying DKW Digital Railcar Repair Scheduler As shown in FIG. 2, an embodiment of the present disclosure provides an ISA 200 workflow for a deploying a DKW digital railcar repair scheduler. As shown by legend 278, process flow 288 is illustrated by solid lined arrow, data flow 290 is illustrated by a dotted line arrow, and an ISA HITL/HOTL flow is illustrated by a hyphenated line arrow. The legend 278 further depicts those components of the ISA that may be placed in persistent storage 280, those components that make up microservices 282, those components that make up ML services 294, those components that make up optimization services 284, and those components where a HITL/HOTL 286 interacts with the ISA. In an embodiment, items shown in dotted shading (i.e., Apply Exclusions 236, Apply Preferences 258, Apply Priority 260) comprise business rules. In an embodiment, items featuring a clock (i.e., Get Request 202, Calculate Priority 216, and Optimize 270) are reoccurring over time.

The framework implemented through the ISA 200 commences by receiving a command to generate a request 202 or perform a task. In an embodiment, requests may be received 202 by the ISA from a human user. In an alternative embodiment requests may be received from another system or program. Requests received 202 may be stored to the ISA's memory. Once a request is received 202 the ISA 200 prepares the request 204 and gathers the information needed to perform the task. During the preparation of the request 204, the ISA gathers customer details 206, gathers program details 208, gathers car details 210, gathers AVSO car type, gathers clear standing room (CSR) comments, calculates priority 216, and updates and inserts (upserts) the request 218 based on the information gathered. The upserted request 218 is stored 220 to the ISA's persistent memory.

Once a request is prepared 204, the ISA 200 makes and filters predictions related to the request or tasks. The ISA predicts statements of work (SOWs) 222 for the DWK. SOWs may be predicted using a previously stored upserted request 220 or a newly prepared request. The ISA uses ML to predict the SOWs 222. ML may be supervised or unsupervised, supervised ML may include linear and logistic regression, naïve Bayes algorithms, classification algorithms, neural network algorithms, and/or random forest algorithms. Unsupervised ML may include k-means clustering algorithms, principal component analysis algorithms, and/or hierarchal clustering algorithms. Once a SOW 222 is predicted it may be stored 224 to the ISA's persistent memory 224. The predicted SOW 222 may be edited or added to by an HITL/HOTL.

After the ISA 200 predicts a SOW 222 the ISA filters repair shops 228. The repair shops may be filtered 228 by car type 230, by commodity 232, and by repair tasks 234. During filtering 228, the ISA applies exclusions 236 to the shops that the ISA seeks to avoid based on previously input commands. In an embodiment, each exclusion is a business rule (that can be either short term or long-term). By way of example, an exclusion business rule might prevent the ISA 200 from sending a particular repair to a particular show (even if it has the capability to perform the repair). The filtered repair shops may be stored to the ISA's persistent memory 238. An HITL/HOTL may add back 240 previously filtered out repair shops.

The ISA 200 next predicts costs 242 using ML. Costs predictions 242 may be made by predicting transit time 244, predicting freight and switching costs 246, and predicting turnaround time 248 and other cost predictive factors known by a person of ordinary skill in the art. Cost predictions 242 may be stored to the ISA's persistent memory 250. An HITL/HOTL 252 may update, transit time, freight, cost, turnaround time, and other cost predictive factors. Cost predictions made by the HITL/HOTL 252 may be stored 250 to the ISA's 200 persistent memory.

The ISA 200 scores 254 cost predictions. The cost predictions are scored 254 by calculating a score 256, applying preferences 258, and applying priority 260. The request shop scores 254 may be stored 262 to the ISA's 200 persistent memory.

The ISA 200 next generates an optimization queue 264. Repair shop scores used for optimization queue may be newly scored shops or shops previously scored and stored in the ISA's persistent memory 262.

The ISA 200 optimizes 270 the repair shop scores to generate a shop assignment 272. During optimization ML, is used to check the availability 268 of the scored repair shops. The checked availability 268 of repair shops may be stored to the ISA's 200 persistent memory. During optimization HITLs/HOTLs may override 266 repair shops scores. During optimization repair shop assignments may be overridden 274 by HITLs/HOTLs. The generated repair shop assignments 272 may be stored to the ISA's persistent memory 276. Once shop assignments have been optimized 270, the ISA 200 acts on its predictions, by assigning a repair shop store 276 to perform the railcar repair. The store assignments may be saved to the ISA's persistent memory.

The foregoing examples have been provided merely for the purpose of explanation and are in no way to be construed as limiting the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods, and uses, such as are within the scope of the appended claims. Those skilled in the art, having the benefit of the teachings of this specification, may affect numerous modifications thereto and changes may be made without departing from the scope and spirit of the invention in its aspects.

Any other undisclosed or incidental details of the construction or composition of the various elements of the disclosed embodiment of the present invention are not believed to be critical to the achievement of the advantages of the present invention, so long as the elements possess the attributes needed for them to perform as disclosed. Certainly, one skilled in the art would be able to conceive of a wide variety of alternatives and system configurations and successful combinations thereof. The selection of these and other details of construction are believed to be well within the ability of one of even rudimental skills in this area, in view of the present disclosure. Illustrative embodiments of the present invention have been described in considerable detail for the purpose of disclosing a practical, operative structure whereby the invention may be practiced advantageously. The designs described herein are intended to be exemplary only. The novel characteristics of the disclosure may be incorporated in other structural forms without departing from the spirit and scope of the invention. The invention encompasses embodiments both comprising and consisting of the elements described with reference to the illustrative embodiments. Unless otherwise indicated, all ordinary words and terms used herein shall take on their customary meaning. All technical terms shall take on their customary meaning as established by the appropriate technical discipline utilized by those normally skilled in that particular art area.

What is claimed is:

1. A system comprising a processor communicatively coupled to a non-transitory memory containing one or more instructions configured to call the processor to implement an intelligent software application (ISA) comprising:

a user interface module configured to generate a user interface, wherein the user interface comprises a plurality of interactable selectable options, the plurality of interactable selectable options including two or more of the following: a master data option, a transaction management option, a business rules option, a decision cockpit option, a generating reports option, and an administrative tasks option;

a services module communicatively coupled to the user interface module, wherein the services module comprises a plurality of microservices configured to facilitate completion of a complex decision flow, wherein the complex decision flow comprises a plurality of complex decisions, wherein the plurality of microservices including two or more of the following: data services, presentation services, analytics services, predictive services, business rules, decision making services, orchestration services, and data quality services;

an artificial intelligence (AI) module communicatively coupled to the services module, wherein the AI module comprises a plurality of AI models configured to facilitate completion of the complex decision flow, the plurality of AI models including two or more of the following: machine learning, AI forecasting, AI algorithms, open pre-trained transformers, and computer vision and natural learning processing, wherein each of the plurality of interactable selectable options are each associated with at least one of the microservices or one of the AI models to facilitate completion of the complex decision flow;

a databases module communicatively coupled to the services module, the AI module, and a data pipelines module and configured to store the plurality of complex decisions pertaining to the complex decision flow, wherein the plurality of complex decisions includes two or more of the following: decision data, decision configurations, decision rules, decision feedback, decision costs, decision agreements, decision scores, and decision forecast;

wherein the decision agreements comprises a statement of work, wherein the statement work is generated using one or more of the plurality of microservices of the service module, one or more of the plurality of AI models of the AI module, or the plurality of complex decisions;

wherein the data quality services comprises data quality rules configured to determine how data contained within the ISA should be cleaned before being used by the data services and the analytics services;

wherein the business rules of the services module comprises rules configured to determine how the data services and the analytics services should manipulate the data to facilitate completion of the complex decision flow;

wherein the ISA is configured to receive a request comprising request information via the user interface, determine a priority level based on the request information, process the request information using one or more of the plurality of microservices of the service module and one or more of the plurality of AI models of the AI module to complete the complex decision flow and to predict the plurality of complex decisions, store the plurality of complex decisions in the database module, and display the plurality of complex decisions via the user interface; and wherein an external services module is configured to transform information received from one or more external sources to create transformed information, apply data quality checks to the transformed information, and apply the rules of the business rules to the transformed information to determine how the transformed information should be stored in the ISA and subsequently used by the data quality services, the data services, and the analytics services.

2. The system of claim 1, wherein the ISA is communicatively coupled to one or more of an authentication module, a report module, an external service module, an external system module, and an external data source.

3. The system of claim 1, wherein the analytics services of the services module is configured to implement one or more analytic services comprising descriptive analytics, predictive analytics, and prescriptive analytics.

4. The system of claim 3, wherein the analytics services comprise utilizing one or more analytics algorithms of the group comprising key performance indicators (KPIs) and metrics, forecasting, and optimization.

5. The system of claim 1, wherein the AI module is configured to implement utilize supervised learning.

6. The system of claim 5, wherein the supervised learning comprises an algorithm selected from the group comprising linear and logistic regression, naïve Bayes algorithms, classification algorithms, neural network algorithms, and random forest algorithms.

7. The system of claim 1, wherein the AI module is configured to implement utilize unsupervised learning.

8. The system of claim 7, wherein the unsupervised learning comprises an algorithm selected from the group comprising k-means clustering algorithms, principal component analysis algorithms, and hierarchical clustering algorithms.

9. The system of claim 1, wherein the user interface is displayed on a client device.

10. The system of claim 1, wherein the one or more external sources services module is configured to access information contained in one or more external sources comprising comprises a data lake and a data warehouse.

11. The system of claim 1, wherein the AI module comprises microservice submodules comprising an embedded analytic engine, a descriptive analytics engine, a predictive analytics engine, and a prescriptive analytics engine.

12. The system of claim 1, wherein the user input is received via the user interface to implement a human-in-the-loop (HITL) model.

13. The system of claim 1, wherein the user input is received via the user interface to implement a human-on-the-loop (HOTL) model.

* * * * *